(12) United States Patent
Thomas et al.

(10) Patent No.: US 11,897,191 B2
(45) Date of Patent: Feb. 13, 2024

(54) LATTICE REINFORCED RADIUS FILLER

(71) Applicant: The Boeing Company, Chicago, IL (US)

(72) Inventors: Charles William Thomas, Issaquah, WA (US); Benjamin Jeffrey Stephenson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 151 days.

(21) Appl. No.: 16/916,035

(22) Filed: Jun. 29, 2020

(65) Prior Publication Data
US 2021/0078212 A1 Mar. 18, 2021

Related U.S. Application Data

(62) Division of application No. 14/304,509, filed on Jun. 13, 2014, now Pat. No. 10,695,958.

(51) Int. Cl.
*B29C 64/153* (2017.01)
*B29C 39/10* (2006.01)
(Continued)

(52) U.S. Cl.
CPC ............ *B29C 64/153* (2017.08); *B22F 10/28* (2021.01); *B22F 10/60* (2021.01); *B29C 39/028* (2013.01); *B29C 39/10* (2013.01); *B29D 99/0014* (2013.01); *B33Y 80/00* (2014.12); *B64C 1/064* (2013.01); *B64C 1/12* (2013.01); *B64C 3/182* (2013.01); *B64C 3/20* (2013.01); *B64C 3/26* (2013.01); *B22F 10/00* (2021.01); *B29C 70/48* (2013.01); *B29K 2063/00* (2013.01); *B29K 2705/08* (2013.01); *B29K 2995/0077* (2013.01);
(Continued)

(58) Field of Classification Search
CPC ..... B29C 39/10; B29C 39/028; B29C 64/153; B29C 70/48; B29D 99/0014; B29D 99/0005; B33Y 80/00; B64C 1/064; B64C 1/12; B64C 3/182; B64C 3/20; B64C 3/26; B64C 2001/0072; B22F 10/00; B22F 10/20; B29K 2063/00; B29K 2705/08; B29K 2995/0077; B29K 2995/0096; B29L 2009/003; B29L 2031/3076; Y02P 10/25; Y02T 50/40; Y10T 428/249921
See application file for complete search history.

(56) References Cited

U.S. PATENT DOCUMENTS 5,026,595 A 6/1991 Crawford et al.
5,833,786 A 11/1998 McCarville et al.
(Continued)

FOREIGN PATENT DOCUMENTS

EP 2727711 A1 5/2014
JP 3549271 B2 8/2004
WO 0162495 A2 8/2001

OTHER PUBLICATIONS

Extended European Search Report, dated Dec. 22, 2015, regarding Application No. 15170460.8, 10 pages.
(Continued)

*Primary Examiner* — Elizabeth M Imani
(74) *Attorney, Agent, or Firm* — Yee & Associates, P.C.

(57) ABSTRACT

A method and apparatus for forming a radius filler. A lattice is formed of connecting elongate members having a three-dimensional shape of the radius filler. A resin is placed within the lattice.

20 Claims, 12 Drawing Sheets

(51) Int. Cl.
| | |
|---|---|
| *B29C 39/02* | (2006.01) |
| *B33Y 80/00* | (2015.01) |
| *B64C 3/26* | (2006.01) |
| *B64C 1/12* | (2006.01) |
| *B29K 705/08* | (2006.01) |
| *B29C 70/48* | (2006.01) |
| *B64C 1/00* | (2006.01) |
| *B29D 99/00* | (2010.01) |
| *B64C 1/06* | (2006.01) |
| *B64C 3/20* | (2006.01) |
| *B64C 3/18* | (2006.01) |
| *B22F 10/28* | (2021.01) |
| *B22F 10/60* | (2021.01) |
| *B22F 10/00* | (2021.01) |
| *B29K 63/00* | (2006.01) |
| *B29L 9/00* | (2006.01) |
| *B29L 31/30* | (2006.01) |

(52) U.S. Cl.
CPC . *B29K 2995/0096* (2013.01); *B29L 2009/003* (2013.01); *B29L 2031/3076* (2013.01); *B64C 2001/0072* (2013.01); *Y02P 10/25* (2015.11); *Y02T 50/40* (2013.01); *Y10T 428/249921* (2015.04)

(56) References Cited

U.S. PATENT DOCUMENTS

| | | | |
|---|---|---|---|
| 6,689,448 B2* | 2/2004 | George | B29D 99/0005 |
| | | | 428/113 |
| 6,849,150 B1 | 2/2005 | Schmidt | |
| 7,758,715 B2 | 7/2010 | Petersson et al. | |
| 7,790,294 B2 | 9/2010 | MacGuire et al. | |
| 7,960,298 B2* | 6/2011 | Goering | B29C 70/24 |
| | | | 442/205 |
| 2005/0112321 A1 | 5/2005 | Millard et al. | |
| 2010/0012787 A1* | 1/2010 | Hand | B64G 1/402 |
| | | | 428/221 |
| 2010/0164147 A1* | 7/2010 | Rodman | B32B 27/281 |
| | | | 264/549 |
| 2012/0291285 A1 | 11/2012 | Kamaraj et al. | |
| 2013/0216815 A1 | 8/2013 | Coyle | |
| 2014/0034236 A1 | 2/2014 | Guzman et al. | |
| 2015/0360396 A1 | 12/2015 | Thomas et al. | |

OTHER PUBLICATIONS

European Patent Office Communication Report, dated Sep. 18, 2018, regarding Application No. 15170460.8, 4 pages.
European Patent Office Communication Report, dated Nov. 25, 2021, regarding Application No. 15170460.8, 4 pages.

* cited by examiner

LATTICE REINFORCED RADIUS FILLER

CROSS-REFERENCE TO RELATED APPLICATION

This application is a divisional of, and claims priority to, application Ser. No. 14/304,509 filed on Jun. 13, 2014 and issued as U.S. Pat. No. 10,695,958 by the U.S. Patent and Trademark Office on Jun. 30, 2020. Accordingly, the content of application Ser. No. 14/304,509 is incorporated herein in its entirety.

BACKGROUND INFORMATION

1. Field

The present disclosure relates generally to manufacturing structures and, in particular, to manufacturing composite structures. Still more particularly, the present disclosure relates to a method and apparatus for a composite structure with a radius filler.

2. Background

Aircraft are being designed and manufactured with greater and greater percentages of composite materials. Composite materials are used in aircraft to decrease the weight of the aircraft. This decreased weight improves performance features such as payload capacities and fuel efficiencies. Further, composite materials provide longer service life for various parts in an aircraft.

Composite materials are tough, light-weight materials created by combining two or more functional components. For example, a composite material may include reinforcing fibers bound in a polymer resin matrix. The fibers may be unidirectional or may take the form of a woven cloth or fabric. The fibers and resins are arranged and cured to form a composite material.

Further, these composite materials may be used to create aerospace composite parts. These parts include, for example, fuselage sections, wings, stabilizers, stringers, spars, I-beams, and other suitable parts. The different parts may be assembled to form the aircraft.

A stringer is an example of a part that may be manufactured from composite materials. A stringer is an elongate member and is configured for attachment to another part, such as a panel. For example, a stringer may be attached to a skin panel for an aircraft. This skin panel may be used in a wing, a fuselage, or other part in the aircraft. The stringer also may help carry loads, transfer loads, or both. For example, a stringer may transfer a load from a skin panel to another part, such as a frame or rib.

In manufacturing composite parts, layers of composite material are typically laid up on a tool. The layers may be comprised of fibers in sheets. These sheets may take the form of fabrics, tape, tows, or other suitable forms. In some cases, resin may be infused or preimpregnated into the sheets. These types of sheets are commonly referred to as prepreg.

The different layers of prepreg may be laid up in different orientations and different numbers of layers may be used depending on the thickness of the composite part being manufactured. These layers may be laid up by hand or using automated lamination equipment such as a tape laminating machine or a fiber placement system. With respect to composite parts such as stringers, laminates may be positioned with respect to each other and cured to form stringers.

Oftentimes, however, a void may be present in a stringer. This void is often generally triangular in shape. The void is filled for manufacturing and structural purposes. The material filling the void may be referred to as a radius filler.

Factors such as thermal shrinkage, stiffness, and strength may result in inconsistencies forming in the radius stiffener when curing this component with the other laminates to form the stringer. These inconsistencies may include, for example, cracking or separation of layers. The interface area where the radius filler meets the laminates also may be susceptible to the formation of inconsistencies. These inconsistencies also may occur during use of the stringer. As a result, the stringer may not perform as desired.

Accordingly, there is a need for a method and apparatus that take into account one or more of the issues discussed above as well as possibly other issues.

SUMMARY

An embodiment of the present disclosure provides an apparatus comprising a lattice of connecting elongate members and a resin within the lattice. The lattice has a three-dimensional shape of a radius filler.

Another embodiment of the present disclosure provides a radius filler comprising a lattice and a resin. The lattice is comprised of a metal having a shape of a channel in a composite part. The resin is located within the lattice. The lattice and the resin have a number of desired performance parameters when located in the channel of the composite part.

Yet another embodiment of the present disclosure provides a method for forming a radius filler. A lattice is formed of connecting elongate members having a three-dimensional shape of the radius filler. A resin is placed within the lattice.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

The illustrative embodiments recognize and take into account one or more considerations. For example, the illustrative embodiments recognize and take into account many stringers are formed from layers of composite material having fibers that are unidirectional. Further, the illustrative embodiments also recognize and take into account that these types of radius fillers are relatively easy to manufacture. However, the occurrence of inconsistencies with these types of radius fillers do not provide a desired level of performance.

The illustrative embodiments also recognize and take into account that a radius filler may be comprised of a stack of plies in which the different plies have different orientations for the fibers. Although this type of filler reduces the occurrence of inconsistencies, inconsistencies may still occur more often than desired.

Thus, the illustrative embodiments provide a method and apparatus for a radius filler for use in composite structures. In one illustrative embodiment, an apparatus comprises a lattice and a resin. The lattice is comprised of connecting elongate members having a three-dimensional shape of a radius filler. The resin is located within the lattice.

Figure 1:
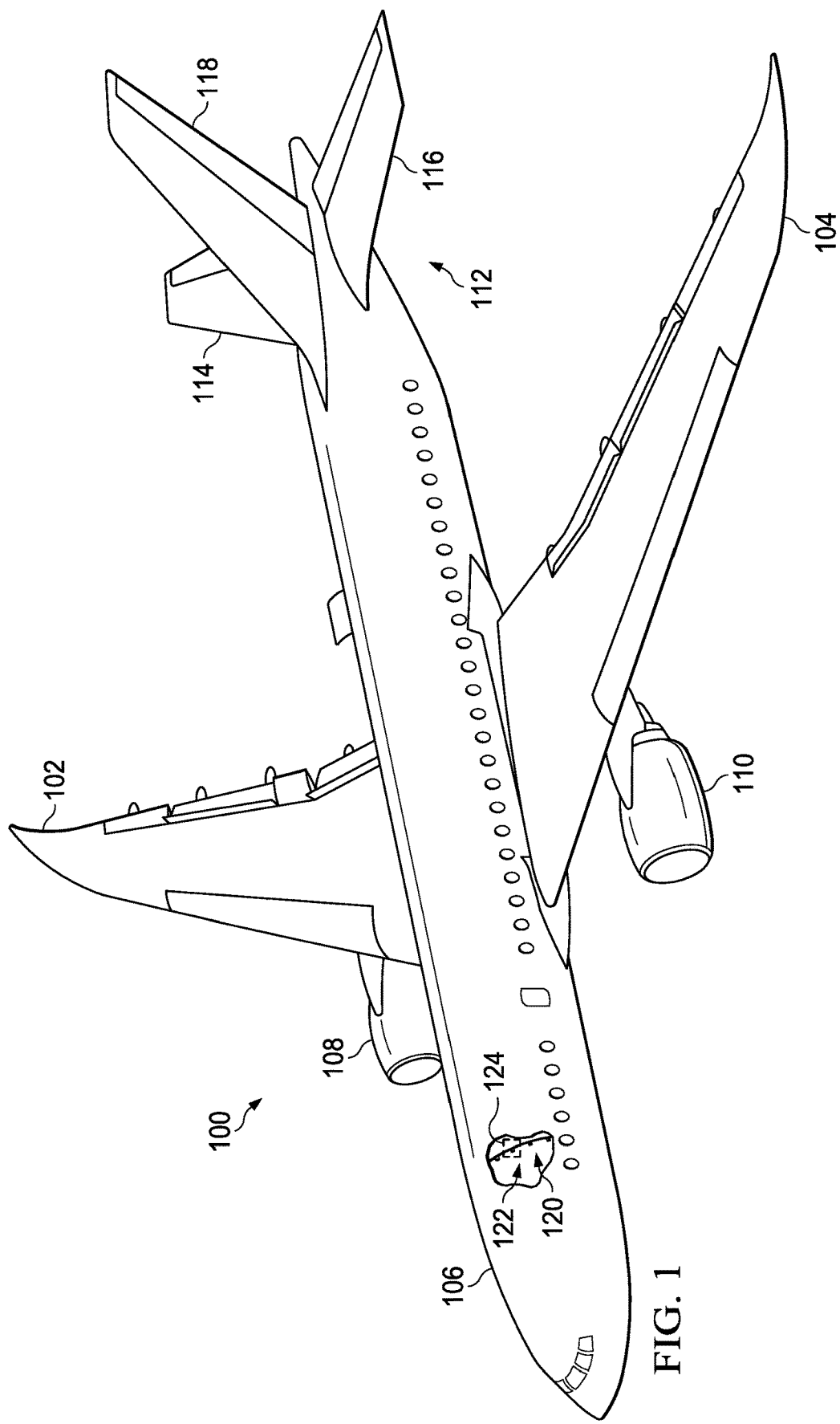
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to fuselage 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of fuselage 106.

Aircraft 100 is an example of an aircraft in which radius fillers in accordance with an illustrative embodiment may be used in structures in aircraft 100. For example, an exposed interior view of fuselage 106 is shown with stringers 120. Radius fillers 122 may be located in stringers 120. A portion of stringers 120 with radius fillers 122 are shown in section 124.

Figure 2:
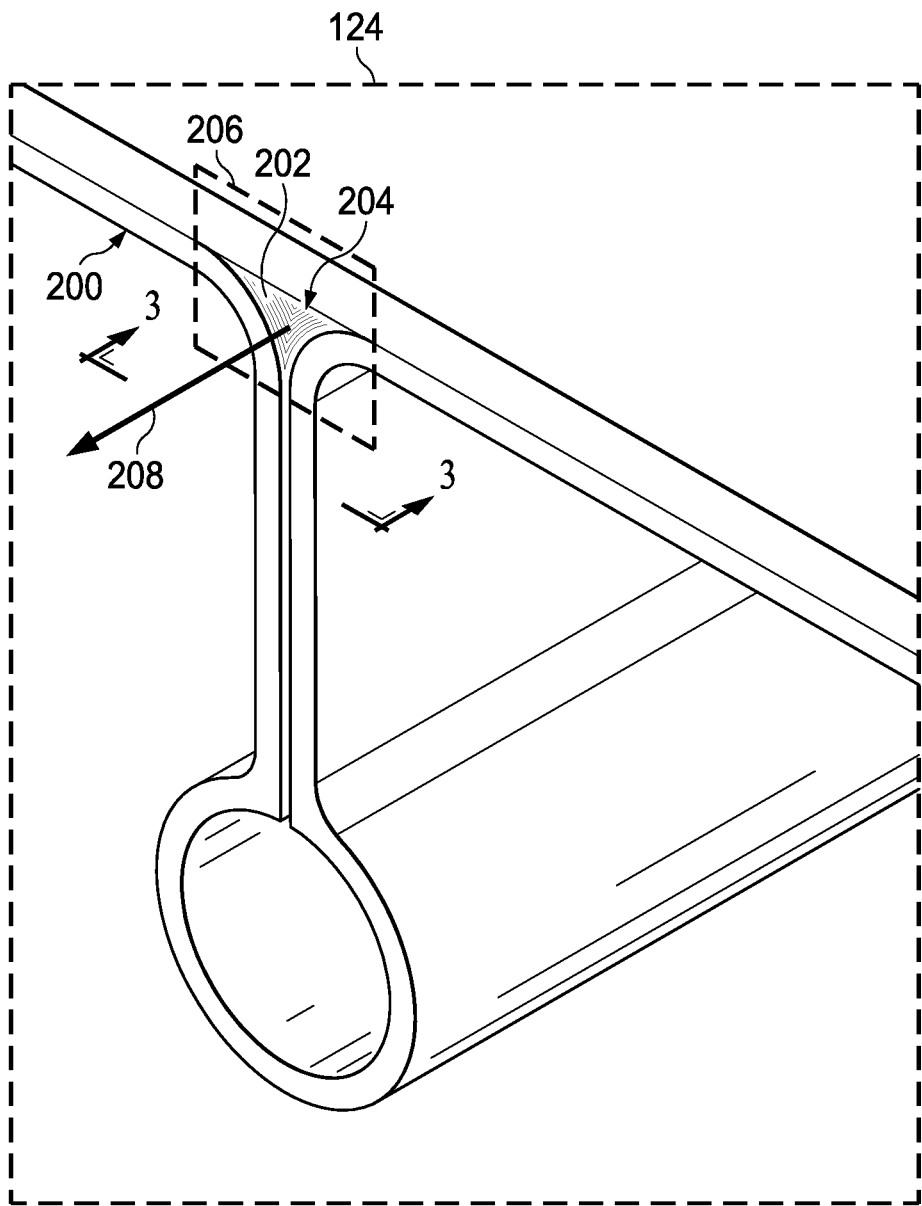
FIG. 2 is a detailed view of a portion of stringers with radius fillers in accordance with an illustrative embodiment.

Turning to FIG. 2, an illustration of a detailed view of a portion of stringers with radius fillers is depicted in accordance with an illustrative embodiment. In this example, a more detailed illustration of section 124 in FIG. 1 is shown.

In this view of section 124, stringer 200 in stringers 120 in FIG. 1 is seen. Also illustrated in this view is radius filler 202 in radius fillers 122 in FIG. 1.

As depicted, radius filler 202 is located within channel 204 of stringer 200 as shown in section 206. Channel 204 extends centrally through stringer 200 along axis 208. As depicted, axis 208 also extends centrally through radius filler 202.

Figure 3:
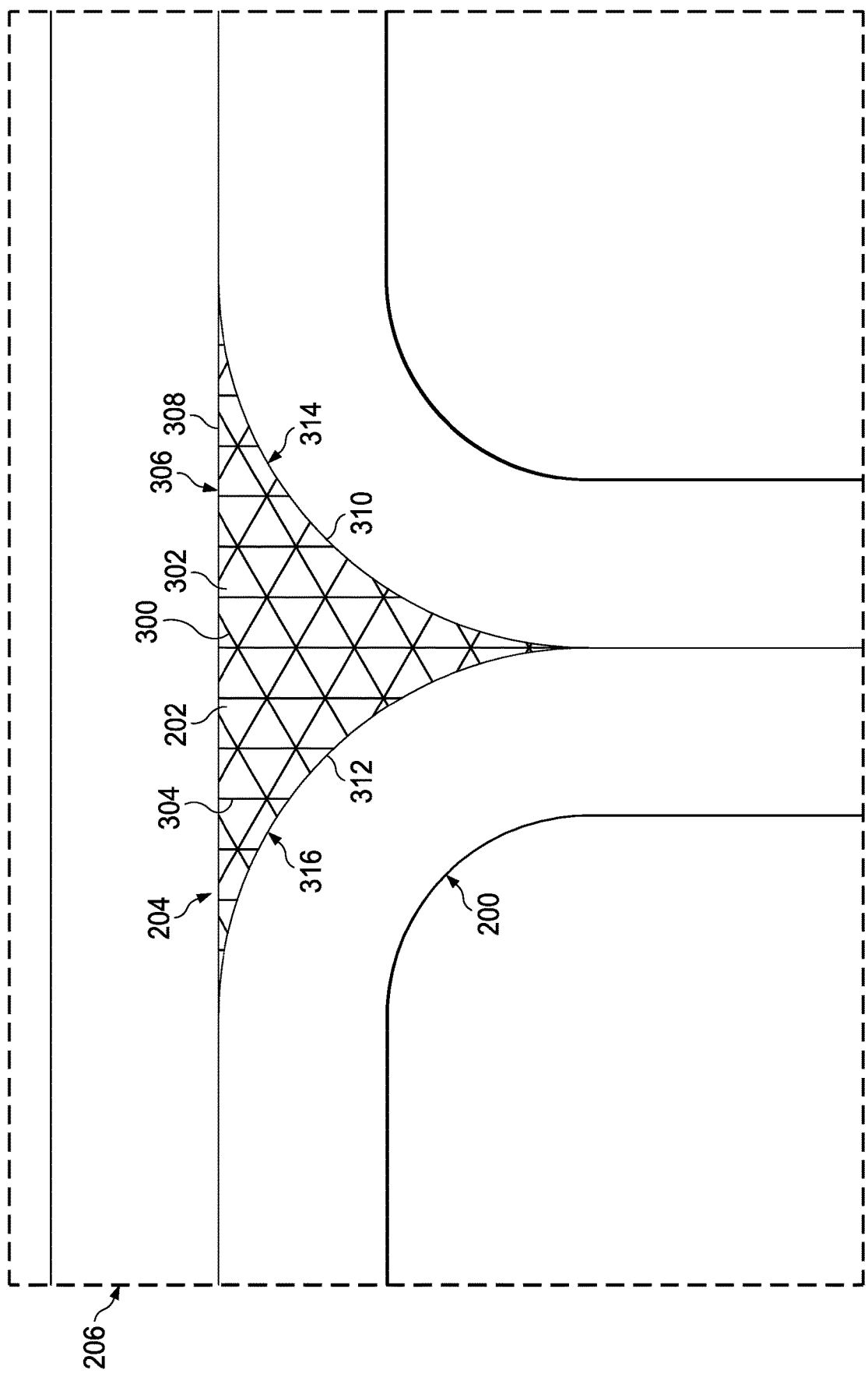
FIG. 3 is a detailed view of a radius filler in accordance with an illustrative embodiment.

Turning next to FIG. 3, a detailed view of radius filler 202 shown in FIG. 2 is depicted in accordance with an illustrative embodiment. In this figure, a more detailed view of radius filler 202 located in channel 204 in stringer 200 in section 206 is shown in the direction of lines 3-3 in FIG. 2.

As shown in this figure, radius filler 202 is comprised of lattice 300 and resin 302. Lattice 300 is formed from connecting elongate members 304. Resin 302 is located within lattice 300.

As depicted, connecting elongate members 304 may have a three-dimensional shape of radius filler 202. In this illustrative example, lattice 300 of connecting elongate members 304 may have different forms. In other words, connecting elongate members 304 may connect to each other forming different shapes. The shapes may be for example, a rectangle, a diamond, a pentagon, a hexagon, or some other suitable shape.

In the illustrative example, the manner in which connecting elongate members 304 connect to each other may be selected to distribute loads applied to radius filler 202. Connecting elongate members 304 may connect to each other to form at least one of two-dimensional shapes or three-dimensional shapes, such as a triangle, a pyramid, or other suitable shapes. The manner in which connecting elongate members 304 connect to each other may be referred to as a geometry for connecting elongate members 304.

The distribution of the loads may reduce the formation of inconsistencies in radius filler 202. For example, the formation of cracks in at least one of resin 302 or lattice 300 in radius filler 202 may be reduced or eliminated.

Also, the shape of the cross section of connecting elongate members 304 may be selected to provide a desired amount of load distribution. The cross section of connecting elongate members 304 may be a circle, a square, an oval, a hexagon, a triangle, or some other suitable shape. The shape of the cross section also may be different for different ones of connecting elongate members 304 and may also change along the length of connecting elongate members 304.

As depicted, the loads may be distributed in the direction of a number of axes for radius filler 202 based on the geometry of connecting elongate members 304. The number axes may be an x-axis, a y-axis, and a z-axis for radius filler 202. The z-axis may be axis 208, which extends centrally through radius filler 202 in FIG. 2. In one illustrative example, the geometry of connecting elongate members 304 in lattice 300 distributes loads in directions of an x-axis, a y-axis, and a z-axis for radius filler 202 in which the z-axis extends centrally through the radius filler 202.

As a result, radius filler 202 may distribute loads in more directions than currently used radius fillers. Currently used radius fillers usually have a plane or direction in which no load or an insufficient amount of load distribution occurs.

As can be seen, walls 306 of channel 204 are curved. In this illustrative example, walls 306 and stringer 200 include wall 308, wall 310, and wall 312. In this illustrative example, walls 306 are for components positioned to form the composite part and stringer 200 having channel 204 with a radius, wherein the shape of radius filler 202 fits within channel 204.

As depicted, walls 306 define a substantially triangular shape for channel 204. In this example, wall 308 is substantially planar. Wall 310 and wall 312 are curved. Wall 310 has radius 314 and wall 312 has radius 316 in this illustrative example.

Radius 314 in wall 310 and radius 316 in wall 312 make it more difficult to have a desired level of performance when using a currently available radius filler. In the illustrative examples, radius filler 202 provides a desired level of performance as compared to currently used radius fillers.

In the illustrative examples, radius filler 202 may be used even when all of walls 306 are substantially planar rather than curved. Radius filler 202 may be manufactured to have a shape that substantially conforms to the shape of walls 306. Further, radius filler 202 also may be used when walls 306 have an irregular surface or shape.

As depicted, radius filler 202 has a cross section with a shape that substantially corresponds to the shape of walls 306 of channel 204. In this illustrative example, radius filler 202 has a cross section with a shape that is substantially triangular. Radius filler 202 may have cross sections that have other shapes. The shape of the cross sections of radius filler 202 depends on the shape of channel 204 in the illustrative examples. For example, the shape may be circular, oval, square, irregular, or some other suitable shape.

As depicted in this example, lattice 300 of connecting elongate members 304 is formed using titanium. The material used to form connecting elongate members 304 in lattice 300 may also be selected from other types of metals or materials depending on the particular implementation. In these illustrative examples, resin 302 in radius filler 202 may be selected from one of a cured state, a partially cured state, and an uncured state within the lattice to form radius filler 202.

Figure 4:
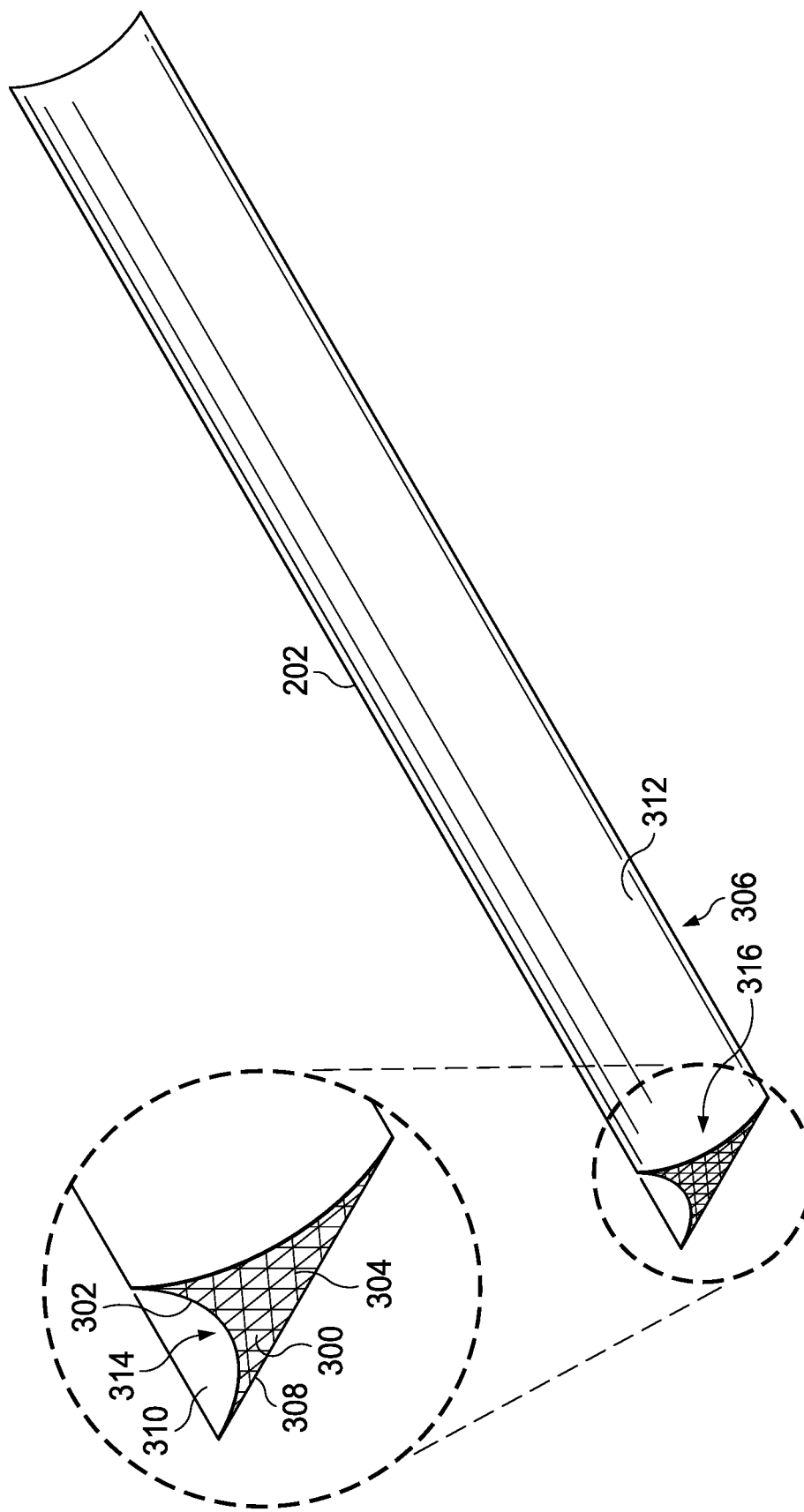
FIG. 4 is an illustration of a perspective view of a radius filler in accordance with an illustrative embodiment.

With reference now to FIG. 4, an illustration of a perspective view of a radius filler is depicted in accordance with an illustrative embodiment. In this figure, radius filler 202 is shown without stringer 200 to better illustrate the shape of radius filler 202. As can be seen in this figure, radius filler 202 has an elongate shape. In the illustrative examples, the three-dimensional shape may take other forms. For example, the three-dimensional shape of radius filler 202 may be curved, sawtooth, or have some other suitable shape other than the elongate shape shown in this illustrative example.

In these illustrative examples, the part in which radius filler 202 is used is a composite part. Of course, radius filler 202 may be used in other types of parts other than composite parts. For example, other types of parts may include metal parts, plastic parts, or other suitable types of parts.

Figure 5:
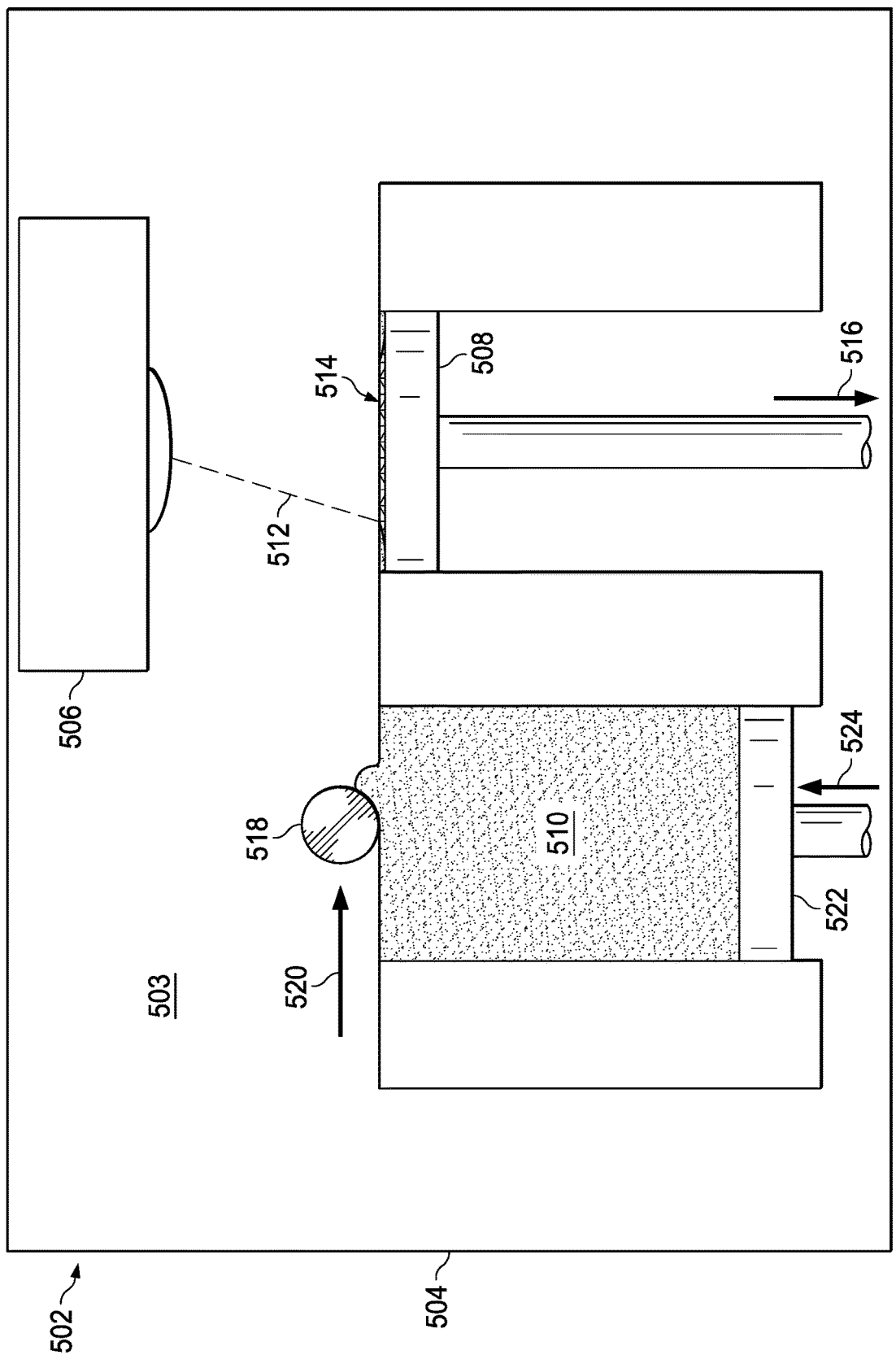
FIG. 5 is an illustration of a portion of a laser sintering machine used to form a lattice for a radius filler in accordance with an illustrative embodiment.
Figure 6:
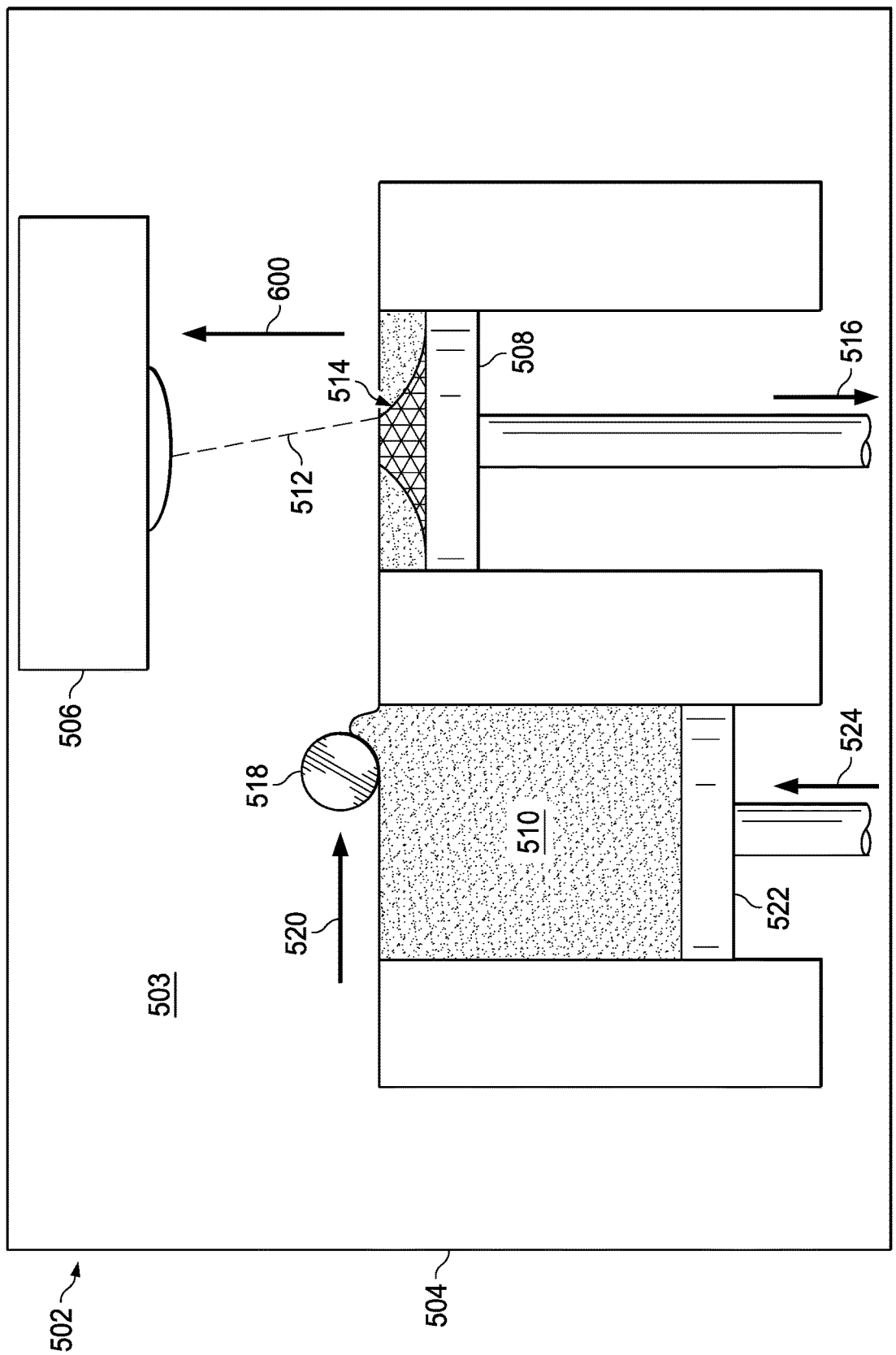
FIG. 6 is an illustration of the fabrication of a structure in accordance with an illustrative embodiment.
Figure 7:
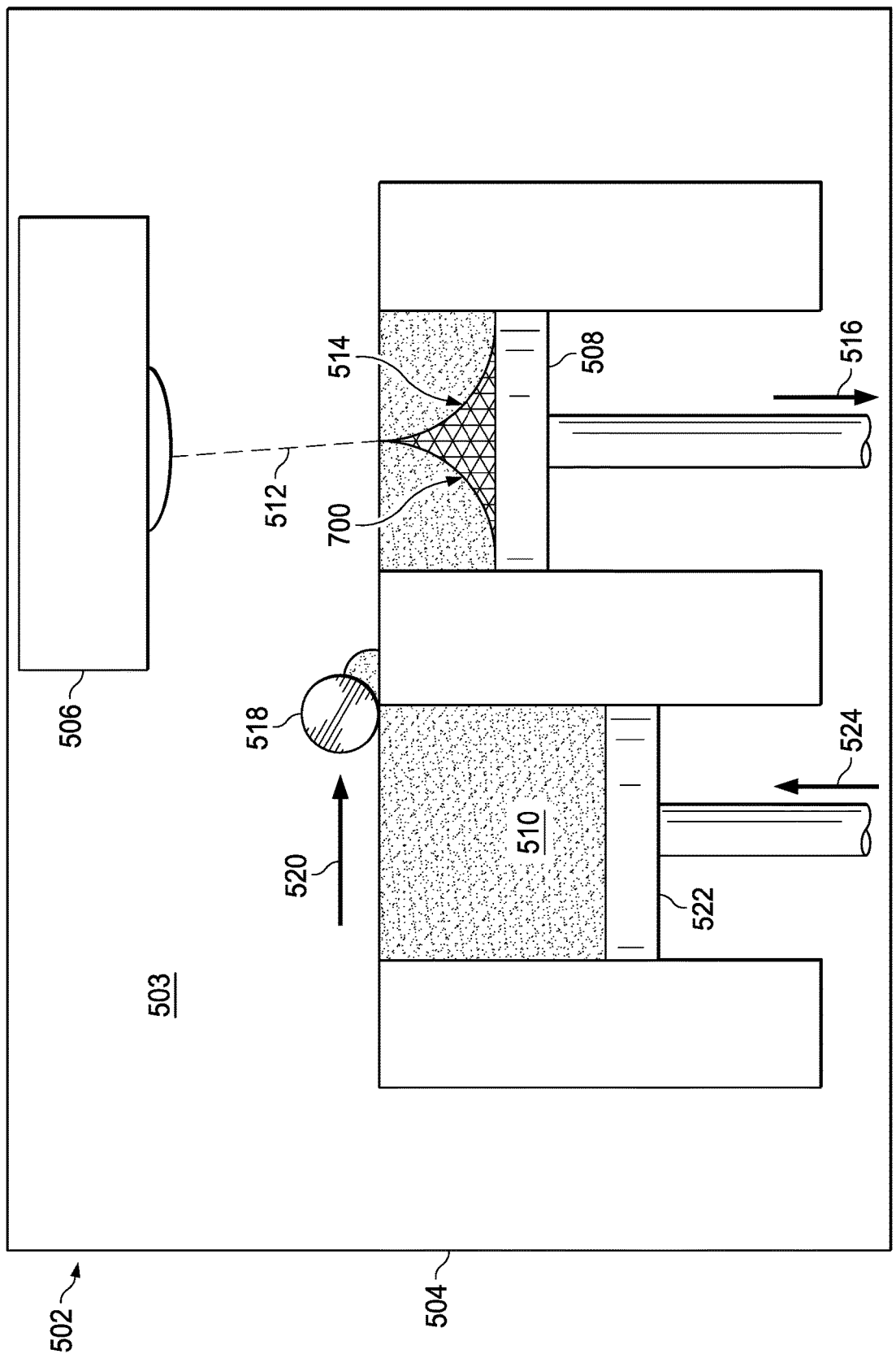
FIG. 7 is an illustration of a completed structure forming a lattice in accordance with an illustrative embodiment.

With reference next to FIGS. 5-7, illustrations of manufacturing a radius filler are depicted in accordance with an illustrative embodiment. With reference first to FIG. 5, an illustration of a portion of a laser sintering machine used to form a lattice for a radius filler is depicted in accordance with an illustrative embodiment. Laser sintering machine 502 is used to perform additive manufacturing in this illustrative example. In particular, laser sintering machine 502 is a selective laser sintering machine. Laser sintering machine 502 may be implemented using a currently available laser sintering machine or device.

In this illustrative example, an interior 503 of laser sintering machine 502 is shown through an exposed view of housing 504. As seen in this view, laser sintering machine 502 includes laser 506 and powder bed 508 located inside housing 504.

As depicted, laser 506 may be controlled to perform a physical process that may include different types of heating to form a lattice for a radius filler in accordance with an illustrative embodiment. For example, laser 506 may perform at least one of full melting, partial melting, or liquid-phase sintering. As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present.

In this illustrative example, powder bed 508 is a platform on which structures are formed. Powder 510 is shown located on powder bed 508. In this illustrative example, powder 510 is a metal. In particular, powder 510 may be a powder form of titanium.

As depicted, laser 506 emits laser beam 512 at powder 510. Powder 510 is sintered by laser beam 512 in this illustrative example to begin forming structure 514. In this illustrative example, powder bed 508 may move in the direction of arrow 516 as structure 514 is formed through a sintering process in this illustrative example.

As additional amounts of powder 510 are needed on powder bed 508, the additional amounts of powder 510 may be placed on powder bed 508 through roller 518 moving in the direction of arrow 520 to push powder 510 on powder delivery platform 522 to powder bed 508. As depicted, powder delivery platform 522 may move in the direction of arrow 524 to provide additional amounts of powder 510 for powder 510 to be moved or pushed onto powder bed 508.

Turning now to FIG. 6, an illustration of the fabrication of a structure is depicted in accordance with an illustrative embodiment. In this illustrative example, structure 514 continues to grow or form in the direction of arrow 600. As powder 510 is sintered to form the portion of structure 514, additional amounts of powder 510 are moved onto powder bed 508 by roller 518 from powder 510 from powder delivery platform 522.

Turning now to FIG. 7, an illustration of a completed structure forming a lattice is depicted in accordance with an illustrative embodiment. In this example, the fabrication of structure 514 has been completed to form lattice 700 as one-piece with elongate members 304 unified in the additive manufacturing process. Lattice 700 may be removed as one-piece from powder bed 508 for further processing.

Figure 8:
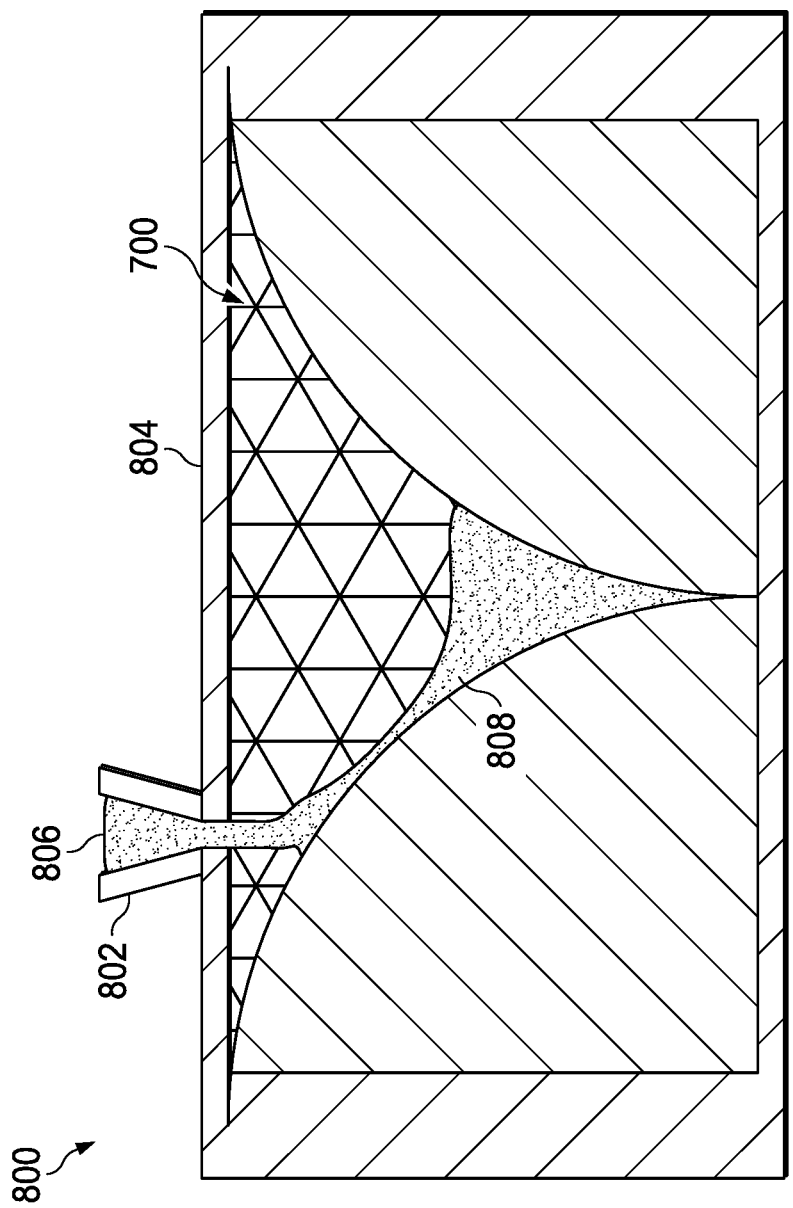
FIG. 8 is an illustration of a resin infusion system in accordance with an illustrative embodiment.

With reference next to FIG. 8, an illustration of a resin infusion system is depicted in accordance with an illustrative embodiment. In this illustrative example, resin infusion system 800 includes nozzle 802 and tool 804 as well as other components that are not shown.

In this illustrative example, lattice 700 is shown as being held within tool 804. Tool 804 is configured to allow resin 806 to flow from nozzle 802 to lattice 700 located in tool 804. In this illustrative example, the flow of resin 806 into lattice 700 may be an infusion of resin 806.

Resin 806 may comprise various materials. In these illustrative examples, resin 806 may be selected as a resin typically used in composite materials, such as those for composite aircraft parts. In this example, resin 806 is a thermoset resin, such as epoxy. In the particular example, the epoxy is a thermoset resin. The epoxy may be a toughened or hardened epoxy in this illustrative example.

In this illustrative example, resin 806 may have a viscosity that causes resin 806 to stay within lattice 700. In this manner, lattice 700 with resin 806 located within lattice 700 may be removed from tool 804 to form radius filler 808 for further processing. In other illustrative examples, lattice 700 with resin 806 may remain within tool 804 for partial or full curing of resin 806 to form radius filler 808.

The illustration of laser sintering machine 502 and the formation of lattice 700 in FIGS. 5-8 are not meant to imply limitations to the manner in which lattice 700 may be implemented. For example, other types of laser sintering machines may be used to manufacture lattice 700. In other illustrative examples, one or more lasers in addition to laser 506 may be used to form lattice 700. Further, powder 510 may be deposited onto powder bed 508 from an overhead delivery system instead of using roller 518. In still other illustrative examples, the different components may not be located in the housing and may be attached to different locations in the manufacturing area.

Figure 9:
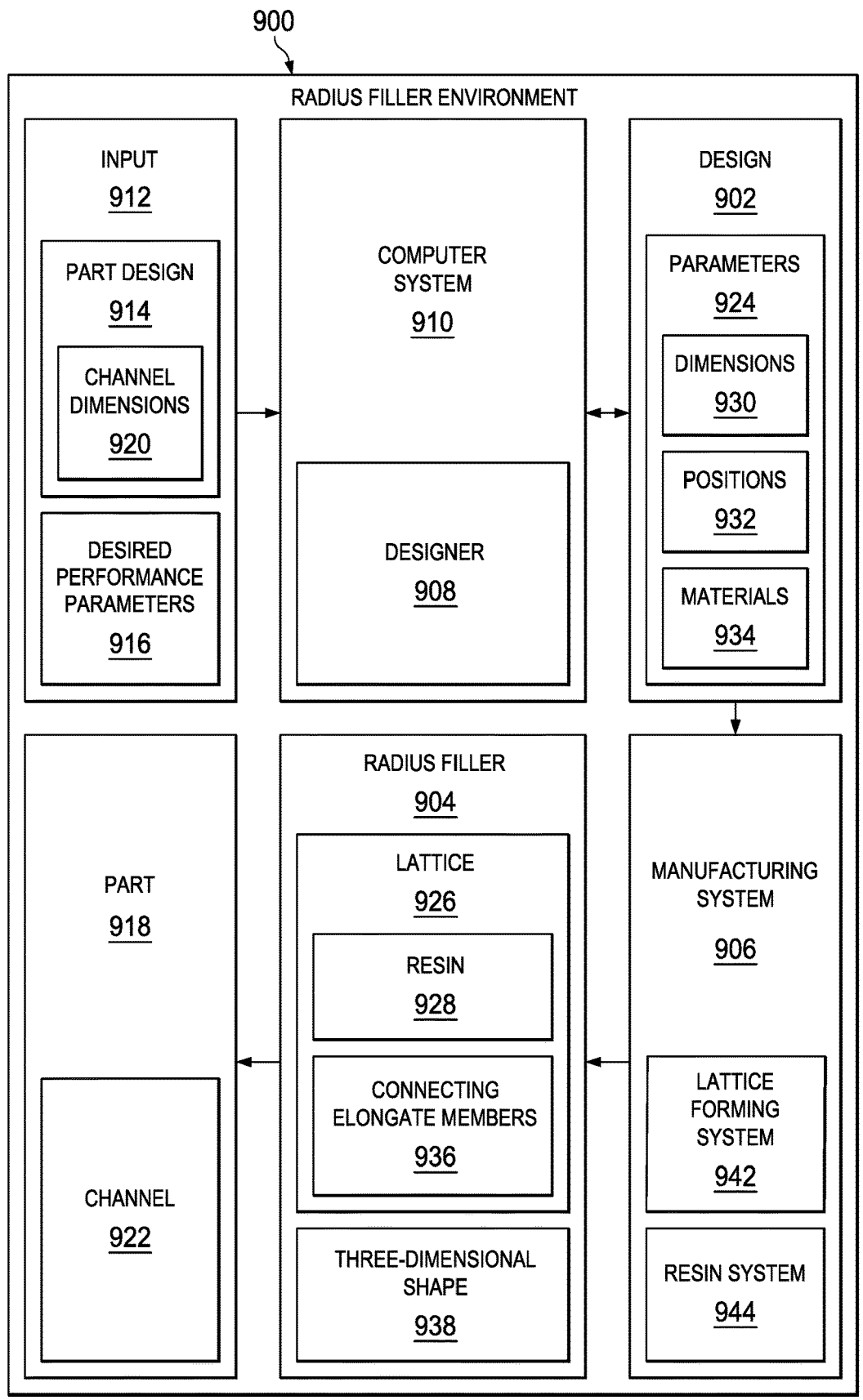
FIG. 9 is an illustration of a block diagram of a radius filler environment in accordance with an illustrative embodiment.

With reference now to FIG. 9, an illustration of a block diagram of a radius filler environment is depicted in accordance with an illustrative embodiment. In this illustrative example, radius filler environment 900 in FIG. 9 is depicted in a block form to illustrate different components for one or more illustrative embodiments that may be used to manufacture radius fillers and parts with radius fillers.

In this illustrative example, design 902 may be generated for radius filler 904. Design 902 may be, for example, a computer-aided design model or some other model that may be used to control manufacturing system 906 to fabricate radius filler 904. In this illustrative example, design 902 may be generated using designer 908.

Designer 908 may be implemented in software, hardware, firmware or a combination thereof. When software is used, the operations performed by designer 908 may be implemented in program code configured to run on a processor unit. When firmware is used, the operations performed by designer 908 may be implemented in program code and data and stored in persistent memory to run on a processor unit. When hardware is employed, the hardware may include circuits that operate to perform the operations in designer 908. In the illustrative examples, the hardware may take the form of a circuit system, an integrated circuit, an application specific integrated circuit (ASIC), a programmable logic device, or some other suitable type of hardware configured to perform a number of operations.

With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, designer 908 may be implemented in computer system 910. Computer system 910 may be one or more computers. When more than one computer is present in computer system 910, those computers may communicate with each other using a communications media such as a network.

In the illustrative example, design 902 for radius filler 904 is generated using input 912. Input 912 may include, for example, part design 914, number of desired performance parameters 916, and other suitable types of input. Input 912 may originate from various sources. For example, input 912 may be received from at least one of a file, a human operator, a computer-aided design, a specification, or some other suitable source.

In the illustrative example, part design 914 may be a computer-aided design model of part 918 in which radius filler 904 is to be used. Part 918 may be selected from one of, for example, a composite part, a stringer, wing stringer, a T-shaped stringer, a horizontal stabilizer, a winglet, a wing box, an I-beam, a stiffener, a wing, or some other suitable part.

In the illustrative example, part design 914 may include channel dimensions 920 for part 918 in which radius filler 904 is to be located. Channel dimensions 920 may include, for example, at least one of cross-sectional shapes, diameter, length, or other suitable parameters that may be used to describe channel 922 in part 918 in which radius filler 904 is to be located.

Number of desired performance parameters 916 is for the performance of radius filler 904 in part 918. In this illustrative example, number of desired performance parameters 916 may be selected from at least one of a load, a coefficient of thermal expansion, toughness, fracture resistance, stiffness, strength, or other suitable performance parameters that may be desirable for radius filler 904.

With input 912, designer 908 generates design 902. For example, designer 908 may generate parameters 924 for radius filler 904. As depicted, parameters 924 may be selected for lattice 926 and resin 928 in radius filler 904. For example, parameters 924 may include at least one of dimensions 930, positions 932, materials 934, or other suitable parameters. Additionally, parameters 924 may include dimensions 930 and positions 932 for lattice 926. As depicted, parameters 924 describe, for example, dimensions 930 and positions 932 for connecting elongate members 936 that form lattice 926.

In the illustrative example, connecting elongate members 936 are members, such as rods, that are connected to each other to form lattice 926. Connecting elongate members 936 may be substantially straight, curved, or have some other shape described by dimensions 930. Positions 932 may describe where connecting elongate members 936 are located in three-dimensional space and the orientation of connecting elongate members 936 in those locations.

As a result, dimensions 930 and positions 932 may be used to describe connecting elongate members 936 for lattice 926 such that lattice 926 may have different forms for different applications. For example, lattice 926 may be selected from one of a regular lattice, an irregular lattice, a grid, a space frame, a Bravis lattice, interconnected spring shapes, or some other suitable form. In this manner, dimensions 930 and positions 932 describe lattice 926 of connecting elongate members 936 as having three-dimensional shape 938 of radius filler 904.

In the illustrative examples, dimensions 930 and positions 932 for connecting elongate members 936 for lattice 926 extend in multiple axes, such as three different axes. This configuration of connecting elongate members 936 in lattice 926 may provide reinforcement in all three axes. This type of reinforcement may result in a reduction in the formation of inconsistencies in at least one of radius filler 904 or part 918.

The toughness of materials 934 for lattice 926 also may result in a reduction in the formation of inconsistencies. Further, the reduction in the propagation of an inconsistency also may be reduced through the design of lattice 926. For example, if an inconsistency takes the form of a crack, lattice

926 may function as a crack resistor when used in combination with resin 928. For example, when titanium is selected for connecting elongate members 936 in lattice 926, the toughness of radius filler 904 may be much greater than currently used radius fillers.

In the illustrative examples, materials 934 may be used to describe materials used or at least one of lattice 926 or resin 928. For example, materials 934 for connecting elongate members 936 in lattice 926 may be selected from at least one of a metal, a metal alloy, titanium, Invar, aluminum, steel, plastic, ceramic, a cured composite material, carbon fibers, or some other suitable material. Materials 934 for resin 928 may be selected from one of a thermoplastic polymer, a thermoset polymer, an epoxy, a bis-maleimide resin, a polyamide, polyurethane, plastic, a metal, a polyester resin, a shape memory polymer (SMP) resin, and other suitable materials.

In the illustrative example, manufacturing system 906 may use design 902 to manufacture radius filler 904. Additionally, manufacturing system 906 also may manufacture part 918 including radius filler 904.

Manufacturing system 906 may include a number of different types of components. For example, manufacturing system 906 may include lattice forming system 942 and resin system 944.

As depicted, lattice forming system 942 may be a system that may be used to form connecting elongate members 936. In this illustrative example, lattice forming system 942 may be an additive manufacturing system such as a laser sintering machine. Laser sintering machine 502 in FIG. 5 is an example of a device that may be used in lattice forming system 942.

For example, selective laser sintering, printing, or other types of manufacturing and fabrication processes may be used to form connecting elongate members 936. When a composite material is used, the composite material is cured to form connecting elongate members 936.

In these illustrative examples, lattice forming system 942 may perform different types of operations depending on the type of device. For example, lattice forming system 942 may perform at least one of sintering a material, printing the material, or some other suitable operation to form the lattice 926.

Resin system 944 is configured to place resin 928 into lattice 926 of radius filler 904. In these illustrative examples, resin system 944 may be selected from at least one of a resin injection system, a resin infusion system, or some other suitable type of system that places resin into lattice 926.

In the illustrative example, resin 928 may be in different states. For example, resin 928 may be in a state selected from one of a cured state, a partially cured state, and an uncured state within lattice 926 to form radius filler 904.

Radius filler 904 may be bonded within channel 922 of part 918, co-cured with other components for part 918, or assembled in other ways such that radius filler 904 is located within part 918 when part 918 is completed to form a finished part ready for use.

The illustration of radius filler environment 900 in FIG. 9 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although radius filler 904 has been described for part 918 for use in aircraft, radius filler 904 may be designed and used in parts other than those for aircraft. For example, part 918 may be used in a platform such as, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, and other suitable platforms.

For example, other types of additive manufacturing systems may be used in addition to or in place of a selective laser sintering device in lattice forming system 942. For example, printing, fused deposition modeling, laminated object manufacturing, or other types of manufacturing and fabrication processes may be used to form connecting elongate members 936.

The different components shown in FIGS. 1-8 may be combined with components in FIG. 9, used with components in FIG. 9, or a combination of the two. Additionally, some of the components in FIGS. 1-8 may be illustrative examples of how components shown in block form in FIG. 9 can be implemented as physical structures.

Figure 10:
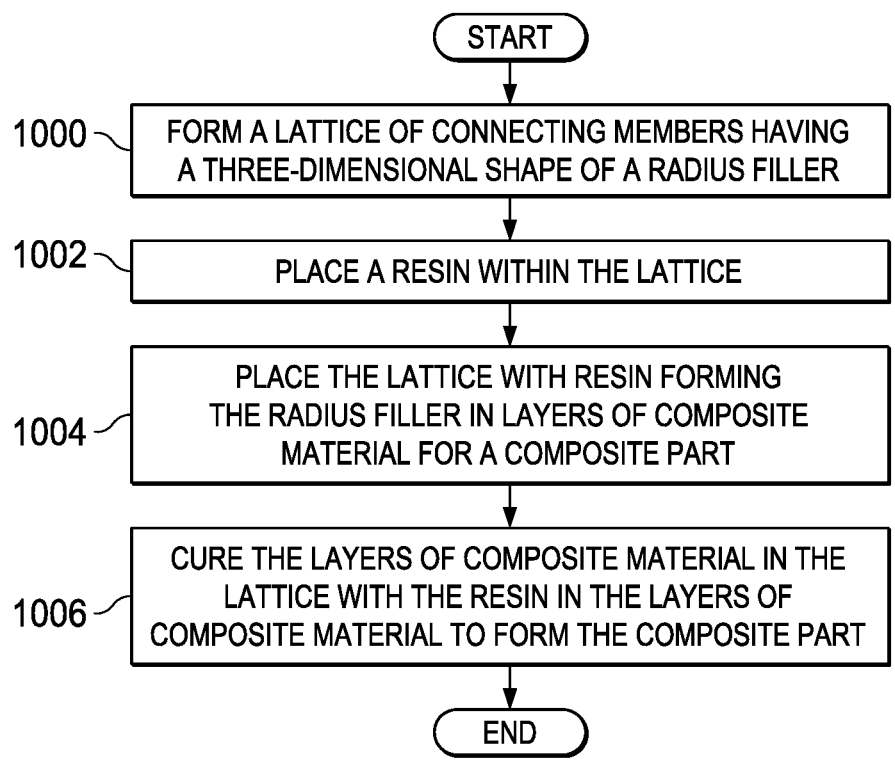
FIG. 10 is an illustration of a flowchart of a process for forming a radius filler in accordance with an illustrative embodiment.

Turning now to FIG. 10, an illustration of a flowchart of a process for forming a radius filler is depicted in accordance with an illustrative embodiment. The process illustrated in FIG. 10 may implemented in radius filler environment 900 in FIG. 9.

The process begins by forming a lattice of connecting elongate members having a three-dimensional shape of a radius filler (operation 1000). Thereafter, a resin is place within the lattice (operation 1002). Operation 1002 forms a radius filler prior to being used to fill a void in a structure such as a stringer or other suitable structure.

Thereafter, the lattice with resin forming the radius filler is placed in layers of composite material for a composite part (operation 1004). In operation 1004, the radius filler is placed in the layers of composite material where a void such as a channel will be present in the composite part. The radius filler may be in a cured state, a partially cured state, or a fully cured state when placed in layers of composite material in operation 1004, depending on the particular implementation.

The process then cures the layers of composite material in the lattice with the resin in the layers of composite material to form the composite part (operation 1006) with the process terminating thereafter. In this operation, resin in the lattice may be cured, uncured, or partially cured when the layers of composite material are cured in operation 1006. For example, the resin in the lattice may be cured and the layers of composite material for the composite part are cured after curing the resin in operation 1006.

Figure 11:
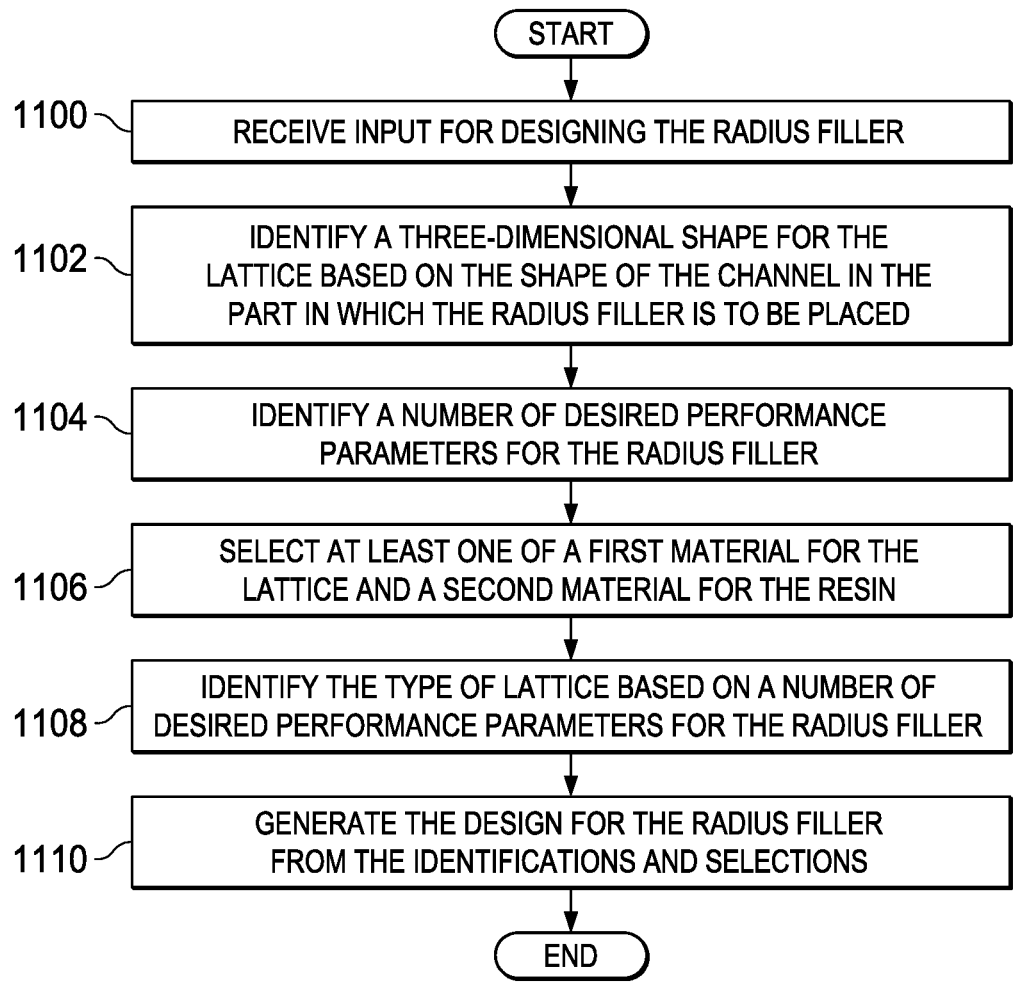
FIG. 11 is an illustration of a flowchart of a process for designing a radius filler in accordance with an illustrative embodiment.

Turning now to FIG. 11, an illustration of flowchart of a process for designing a radius filler is depicted in accordance with an illustrative embodiment. The process illustrated in FIG. 11 may be used to generate a design for manufacturing a radius filler. The process in FIG. 11 may be implemented in designer 908 in the illustrative examples.

The process begins by receiving input for designing the radius filler (operation 1100). This input may include, for example, a part design, a number of desired performance parameters, and other suitable types of input.

Thereafter, the process identifies a three-dimensional shape for the lattice based on the shape of the channel in the part in which the radius filler is to be placed (operation 1102). The shape of the channel may be identified from the part design received in input.

The process identifies a number of desired performance parameters for the radius filler (operation 1104). The process then selects at least one of a first material for the lattice or a second material for the resin (operation 1106).

The process also identifies the type of lattice based on a number of desired performance parameters for the radius filler (operation 1108). The process then generates the design for the radius filler from the identifications and selections (operation 1110) with the process terminating thereafter.

Figure 12:
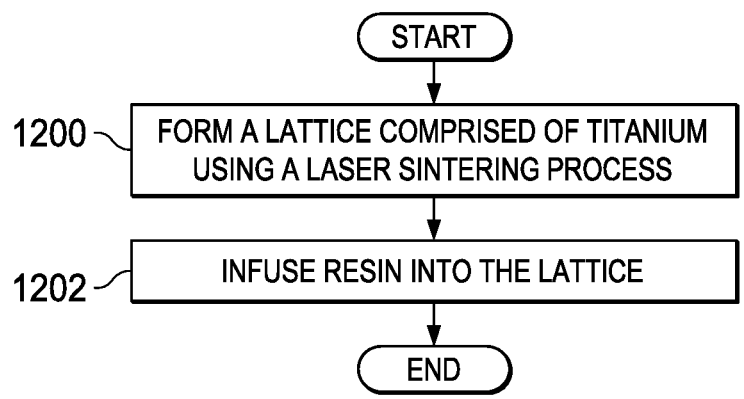
FIG. 12 is a more detailed illustration of a flowchart of a process for forming a radius filler in accordance with an illustrative embodiment.

Turning now to FIG. 12, a more detailed illustration of a flowchart of a process for forming a radius filler is depicted in accordance with an illustrative embodiment. The process illustrated in FIG. 12 may be implemented in radius filler environment 900 in FIG. 9.

The process begins by forming a lattice comprised of titanium using a laser sintering process (operation 1200). Operation 1200 may be implemented using lattice forming system 942 in FIG. 9. One example of a lattice forming system is laser sintering machine 502 shown in FIGS. 5-7. The laser sintering machine may be used to form elongate members for a lattice that may have a desired level of fineness.

The process then infuses resin into the lattice (operation 1202), with the process terminating thereafter. The resin may be infused by resin infusion system 800 in FIG. 8. This resin may be fully cured, partially cured, or uncured. An uncured resin may be used in some cases when the resin has a desired level of viscosity. For example, the resin may be a solid, warm room temperature.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, although the different operations in FIG. 1 have been described with respect to a composite part in which the radius fillers are located, the radius filler may be placed into other types of parts. For example, the radius filler may be placed in a plastic part, a metal part, a wood part, or some other suitable type of part.

As another example, operations 1102-1108 above may be performed in other orders than those shown. Also, some of these operations may be performed at substantially the same time with performance of the operations possibly overlapping in time.

Figure 13:
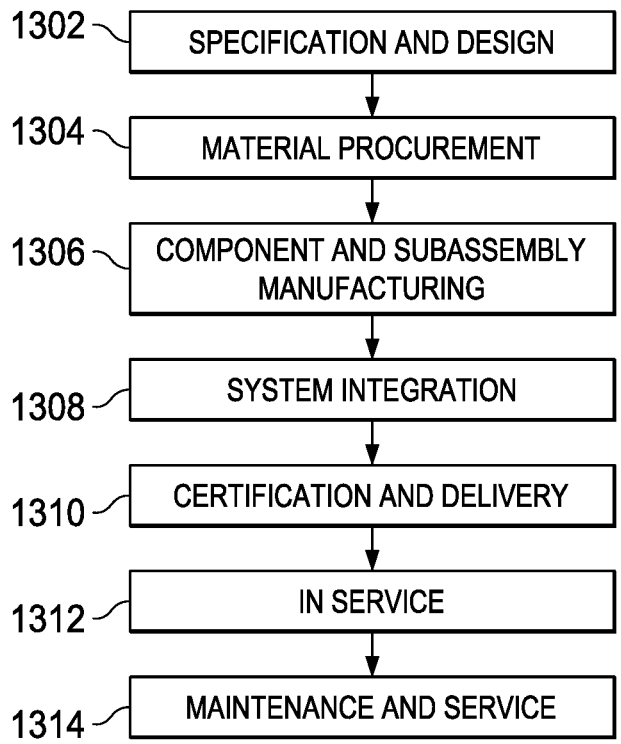
FIG. 13 is an illustration of an aircraft manufacturing and service method in the form of a block diagram in accordance with an illustrative embodiment.
Figure 14:
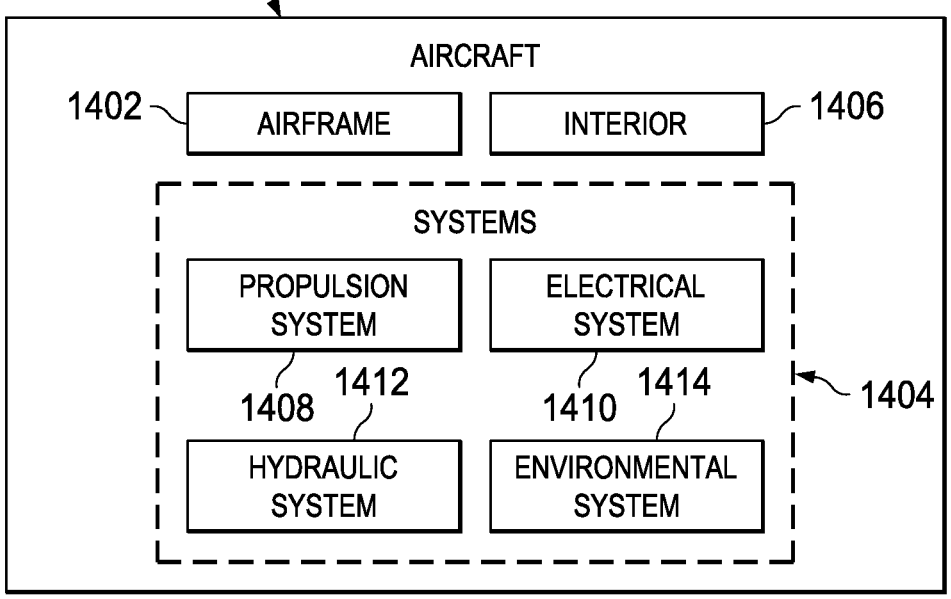
FIG. 14 is an illustration of an aircraft in the form of a block diagram in which an illustrative embodiment may be implemented.

The illustrative embodiments of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in the form of a block diagram in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in the form of a block diagram in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13. In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13. As yet another example, one or more apparatus embodiments, method embodiments, or a combination thereof may be utilized during production stages, such as component and subassembly manufacturing 1306 and system integration 1308 in FIG. 13.

One or more apparatus embodiments, method embodiments, or a combination thereof may be utilized while aircraft 1400 is in service 1312, during maintenance and service 1314 in FIG. 13, or both. The use of a number of the different illustrative embodiments may substantially expedite the assembly of aircraft 1400, reduce the cost of aircraft 1400, or both expedite the assembly of aircraft 1400 and reduce the cost of aircraft 1400.

For example, composite parts with a radius filler may be manufactured and implemented during different times. For example, a composite part may be manufactured in accordance with an illustrative embodiment during component and subassembly manufacturing 1306, during maintenance and service 1314, or some other time. For example, a composite part may be manufactured during specification and design 1302 is a prototype for testing to determine whether particular design is a desired design for a composite part.

Thus, one or more illustrative embodiments provide a method and apparatus for a radius filler that may be used in a part. In the illustrative examples, the part may be a composite part having a channel in which the radius filler is located. This composite part may be formed from laminates positioned with respect to each other to form a desired shape for the composite part. The radius filler in the illustrative examples may provide desired performance parameters with respect to a load, temperature changes, or other environmental conditions.

In particular, the illustrative examples may provide a desired level of performance parameters for an interface load path within the radius filler. The radius filler in the illustrative examples may reduce the formation of inconsistencies that may cause a reduction in the strength of the radius filler, the composite part in which the radius filler is located, or both. These inconsistencies may be those in the radius filler or other parts of the composite part.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus that comprises:
    a lattice shaped as a one-piece additive manufactured structure that comprises unified elongate members that form a first curved peripheral side, a second curved peripheral side, and a third peripheral side, wherein:
        a first elongate member of the unified elongate members extends from the first curved peripheral side to the second curved peripheral side: and
        a second elongate member of the unified elongate members extends from the first curved peripheral side to the third peripheral side; and
    a resin that fills all space between the unified elongate members in the lattice and forms a radius filler.

2. The apparatus of claim 1, wherein the unified elongate members comprise a sintered powder.

3. The apparatus of claim 1, wherein the resin is in a state selected from one of: a cured state, a partially cured state, and an uncured state, within the lattice and forms a radius filler.

4. The apparatus of claim 1, wherein the lattice is selected from one of a regular lattice, an irregular lattice, a grid, a space frame, a Bravis lattice, and interconnected spring shapes.

5. The apparatus of claim 1, wherein the lattice is comprised of a material selected from at least one of: a metal, a metal alloy, titanium, Invar, aluminum, steel, plastic, ceramic, a cured composite material, or carbon fibers.

6. The apparatus of claim 1, wherein the resin is selected from one of: a thermoplastic polymer, a thermoset polymer, and a metal.

7. The apparatus of claim 3, wherein a geometry of the unified elongate members in the lattice distributes loads in directions of an x-axis, a y-axis, and a z-axis for the radius filler in which the z-axis extends centrally through the radius filler.

8. A radius filler that comprises:
    a lattice shaped as a one-piece additive manufactured structure that comprises a sintered metal powder configured to form unified elongate members that comprise: a first curved peripheral side, a second curved peripheral side, and a third peripheral side, configured to fill a channel in a composite part, wherein:
        a first elongate member of the unified elongate members extends from the first curved peripheral side to the second curved peripheral side; and
        a second elongate member of the unified elongate members extends from the first curved peripheral side to the third peripheral side; and
    a resin that fills any space between the unified elongate members, wherein the lattice and the resin comprise a number of desired performance parameters that comprise a stiffness.

9. The radius filler of claim 8, wherein the sintered metal powder is selected from one of titanium, steel, aluminum, Invar, and a metal alloy.

10. The radius filler of claim 8, wherein the number of desired performance parameters further comprise at least one of: a load, a coefficient of thermal expansion, a toughness, a fracture resistance, or a strength.

11. A lattice shaped as a single additive manufactured structure configured to fill a void formed between walls of connected parts, such that the lattice comprises:
    unified elongate members that form a first curved peripheral side, a second curved peripheral side, and a third peripheral side, of the lattice, wherein:
        a first elongate member of the unified elongate members extends from the first curved peripheral side to the second curved peripheral side; and
        a second elongate member of the unified elongate members extends from the first curved peripheral side to the third peripheral side;
    the lattice conforms to a shape of the void and is configured to touch every wall of the void such that loads applied to the lattice distribute along an x-axis, a y-axis, and a z-axis; and
    an interior infused with a resin that fills any space between the unified elongate members.

12. The lattice of claim 11, wherein the elongate members comprise a sintered powder and a design configured to inhibit propagation of an inconsistency in a connection between the connected parts.

13. The lattice of claim 11, wherein the unified elongate members are cured to each other.

14. The lattice of claim 11, wherein a wall of the walls comprises a curved shape.

15. The lattice of claim 11, wherein the unified elongate members comprise a metal.

16. The lattice of claim 11, wherein the unified elongate members comprise titanium.

17. The lattice of claim 11, wherein the void and the lattice each extend along the z-axis, such that the void forms a channel.

18. The lattice of claim 11, wherein the unified elongate members comprise sintered powder.

19. The lattice of claim 11, wherein the shape of the lattice conforms to a design from a computer-aided model of the connected parts.

20. The lattice of claim 19, wherein the design comprises performance parameters, for a radius filler that comprises the lattice and the resin, selected from at least one of: a load, a coefficient of thermal expansion, a toughness, a fracture resistance, a stiffness, or a strength.

\* \* \* \* \*